United States Patent
van den Nieuwelaar et al.

(10) Patent No.: US 7,128,937 B2
(45) Date of Patent: Oct. 31, 2006

(54) METHOD OF PRESERVING MEAT OF SLAUGHTERED POULTRY OR PARTS THEREOF

(75) Inventors: Adrianus Josephes van den Nieuwelaar, Gemert (NL); Andries Moret, Dordrecht (NL)

(73) Assignee: Stork PMT B.V., AV Boxmeer (NL)

( * ) Notice: Subject to any disclaimer, the term of this patent is extended or adjusted under 35 U.S.C. 154(b) by 0 days.

(21) Appl. No.: 10/840,214

(22) Filed: May 5, 2004

(65) Prior Publication Data

US 2004/0241295 A1    Dec. 2, 2004

Related U.S. Application Data

(63) Continuation of application No. PCT/NL02/00704, filed on Nov. 5, 2002.

(30) Foreign Application Priority Data

Nov. 5, 2001   (NL) ................................. 1019298

(51) Int. Cl.
   A23B 4/18     (2006.01)
   A23L 1/315    (2006.01)
(52) U.S. Cl. .................. 426/332; 426/335; 426/532; 426/644
(58) Field of Classification Search ................ 426/331, 426/332, 335, 532, 524, 644; 62/259.4, 374
   See application file for complete search history.

(56) References Cited

U.S. PATENT DOCUMENTS

| | | | |
|---|---|---|---|
| 3,729,773 A | 5/1973 | Dillon | |
| 3,745,026 A | 7/1973 | Hansen et al. | |
| 4,196,221 A | 4/1980 | Dew | |
| 4,199,958 A | 4/1980 | Masuda et al. | |
| 4,810,515 A | 3/1989 | Bourdel | |
| 5,490,992 A | 2/1996 | Andrews et al. | |
| 5,595,066 A * | 1/1997 | Zwanikken et al. | .......... 62/374 |
| 6,063,425 A | 5/2000 | Kross et al. | |
| 6,103,286 A | 8/2000 | Gutzmann et al. | |

FOREIGN PATENT DOCUMENTS

| | | |
|---|---|---|
| DE | 3311437 A1 | 10/1984 |
| GB | 2280093 A | 7/1993 |
| GB | 2295763 A | 6/1996 |
| JP | 02100629 | 4/1990 |
| NL | 8800567 | 10/1989 |
| NL | 9301244 | 2/1995 |
| WO | WO 03/039263 A1 | 5/2003 |

OTHER PUBLICATIONS

Allen, et al., "Investigation of hygiene aspects during air chilling of poultry carcases using a model rig," *British Poultry Science*, 41:575-583 (2000).
Matyniak, et al., "Poultry Carcass Cooling Using Air Stream and Intermittent Application of Water Mist," *Przemsyl Spozywczy*, 32(5):188-190 (Abstract XP-002203383 Database FSTA 'Online International Food Information Service).
Veercamp, "Evaporative Air Chilling of Sub-scald Poultry," *Poultry International*, 20(1):16-22 (Jan. 1981).
Database WPI Section Ch, Week Apr. 1986, Derwent Publications Ltd., London, GB; AN 1986-023329 XP002203384, Monori Mezogazdasag, Nov. 28, 1985 Abstract.

* cited by examiner

*Primary Examiner*—Arthur L. Corbin
(74) *Attorney, Agent, or Firm*—Kristin J. Doyle; John S. Pratt; Kilpatrick Stockton LLP

(57) ABSTRACT

In a method of chilling slaughtered poultry or parts thereof, the poultry is conveyed through a chilling room, or at least through a part of said chilling room, and in the process is exposed to a stream of chilling air. During the chilling of the poultry the skin of the poultry is moistened. The skin of the poultry is moistened by spraying it with water in a spray area that is separated from the stream of chilling air.

13 Claims, 4 Drawing Sheets

METHOD OF PRESERVING MEAT OF SLAUGHTERED POULTRY OR PARTS THEREOF

CROSS-REFERENCE TO RELATED APPLICATION

This is a Continuation Patent Application of PCT/NL02/00704, filed on Nov. 5, 2002, which claims priority to Netherlands Patent Application No. 1019298 filed on Nov. 5, 2001.

The present invention relates in general to the preservation of meat, in particular by chilling slaughtered poultry or parts thereof as an element in the processing and preservation process of slaughtered poultry in a slaughterhouse.

During such a processing and preservation process slaughtered poultry undergoes a number of steps that are usual in the slaughterhouse, such as stunning, killing, plucking, hanging and so forth. On arrival in the slaughterhouse, the poultry is hung up by the legs in product carriers, which are interconnected by a chain and are moved along by means of a conveyor. In a subsequent step the poultry is stunned, and possibly subsequently killed, by electrical or mechanical means, or by means of a suitable stunning gas. The carotid artery of the poultry is then severed, so that the poultry bleeds dry. A subsequent step in the processing process is the scalding of the poultry. During this step the poultry is prepared for the subsequent step of plucking, in the course of which the feathers are removed. In a subsequent step it is usual for the carcass of the poultry to be opened near the cloaca and for the viscera to be removed through the opening that has been made in the abdominal cavity. At this point the poultry is not yet ideal for consumption. First of all, the meat has to undergo a hanging period. During the hanging of the meat, it is given the opportunity to go through the cooling and firming process. Were the hanging period to be skipped and an immediate start were made on boning of the carcass, the muscles would stiffen after being detached from the bone, and a very tough end product would result.

During the hanging process the slaughtered poultry undergoes a chilling operation, in which the poultry is conveyed through a chilling room. The purpose of chilling the poultry is to preserve the fresh meat of the poultry by reducing the temperature of the meat as early as possible in the processing process and maintaining it at a low level.

The chilling process in a poultry slaughterhouse is carried out in a number of different ways. Known variants are air chilling, water bath chilling or immersion chilling and spray chilling. In the case of air chilling the poultry to be chilled is, generally speaking, processed completely dry. The poultry is exposed to a stream of chilled air, and the heat of the poultry is released into the air. In the case of immersion chilling and spray chilling the poultry to be chilled is processed wet. In this case the poultry is immersed in a water bath or sprayed with a large quantity of water respectively.

It is also possible to use a combination of these variants. Which combination is the most suitable depends, inter alia, on the desired end result (fresh product, deep frozen product) and/or the preceding process in the slaughterhouse.

A variant used in practice is chilling the poultry by means of spray chilling combined with air chilling, sprayers being disposed in the chilling room in order to moisten the poultry.

Chilling slaughtered poultry in such a way is known from, for example, Dutch Patent Application NL-8800567, which has been laid open for inspection. This publication discloses a method and a device for chilling slaughtered poultry, in which one of the chilling methods used constitutes chilling of the poultry with chilled air combined with spraying it with chilled water. The known method also comprises a second chilling phase with air cooling alone, in which the poultry, and in particular the skin of the poultry, is left dry, so that the end product is dry. The known chilling process has a number of disadvantages.

A first disadvantage is connected with the scalding of the poultry earlier in the processing process. When a so-called high scalding process is used on the slaughtered poultry, in the case of which the poultry is scalded for a certain period of time at a temperature of around 55° C. or more, the epidermis of the skin of the poultry has largely disappeared. When such a highly scalded bird is chilled by means of air chilling, moisture will be drawn from the bird and the skin will dry. The result of the drying of the skin is that the latter becomes water-repellent. Furthermore, discoloration of the skin occurs, which is undesirable from the point of view of presentation. In addition, chilling with air has the disadvantage that an uneven moisture distribution occurs in the bird. The fact is that some parts of the bird dry more quickly than other parts, such as the thick parts, and an unbalanced distribution of moisture therefore occurs in the bird.

Another disadvantage of the combined spray chilling and air chilling, as described, for example, in the document VEERKAMP, C. "Evaporative Air Chilling of Sub-scald Poultry", Poultry International, Part 20, No. 1, 1981, hereinafter called Veerkamp, is that an additional quantity of moisture is introduced into the chilling room. In order to obtain good moistening of the poultry, the chilled water is atomized in the direction of the poultry. The size of the droplets is kept as small as possible, in order to be able to guarantee good moistening of the poultry. In the chilling room there is, however, an air stream that entrains a (considerable) part of the atomized water and distributes it in the chilling room, so that the humidity in the chilling room will increase. The increase in the air humidity in the chilling room will contribute in an adverse way towards more rapid and greater frosting of that part of the evaporators of the chilling plant that is located in the chilling room, than the frosting that occurs when no air chilling at all is used. With the aid of fans, chilling air is blown over the evaporators, which are very cold, in particular having a temperature that is below the freezing point of water. This means that water will immediately freeze on the evaporators (frosting). This therefore matters in particular when chilling air temperatures below freezing point are used, in which case additional defrosting capacity has to be provided for the evaporators.

A direct consequence of this is also that a relatively large quantity of water will be needed to spray the poultry completely, because a considerable part of the atomized water will go into the chilled air stream in the case of the process described above. A further consequence of it is that a considerable amount of evaporation of the atomized water will occur in the stream of chilling air, which adversely affects the degree of chilling that can be achieved.

It is an object of the present invention to provide an improved method of chilling slaughtered poultry, in the case of which the abovementioned disadvantages are eliminated or at least reduced, or at the very least to provide an alternative to the known method of chilling slaughtered poultry.

This object is achieved by a method according to claim 1, in which the poultry is conveyed through a chilling room, or at least through a part of said chilling room. During the conveyance the poultry is exposed to a stream of chilling air. During this exposure of the poultry or parts thereof to the chilling air, at least the skin of the poultry or parts thereof is moistened by atomization of water. At least a disinfectant and/or antibacterial agent is added to the water for moistening the poultry, so that the growth of bacteria is inhibited. Besides, with the method according to the invention, only a small quantity of a disinfectant and/or antibacterial agent is needed because, on the one hand, little water is needed for moistening the poultry and, on the other hand, the concentration of the agent will increase in the water film as the water film evaporates. This means that during the evaporation of the water film on the skin of the poultry an increasingly better effect is obtained from the disinfectant and/or antibacterial agent.

The moistening of the poultry may be carried out when the poultry or parts thereof is/are separated from the stream of chilling air.

A very focused spraying of the poultry is achieved by the method, and in particular it has the great advantage that no water in atomized form is introduced into the chilling room, where it is spread through the chilling room and can precipitate in the form of frost on the evaporators. Certainly, where chilling air at a temperature below freezing point is used, this will be very advantageous, if only from the point of view that no additional defrosting capacity will be needed for the evaporators. Moreover, it is possible to work at a lower air temperature than is the case with the known method, so that there can be more rapid and deeper chilling.

Another important advantage that can be achieved by the method according to the invention is that, because of the fact that less or no atomized water goes into the stream of chilling air, there is no adverse effect on the degree of chilling through evaporation of atomized water in the stream of chilling air, and that it is possible to achieve lower chilling temperatures than those achieved by conventional chilling methods such as described, for example, in Veerkamp. Lower chilling temperatures in turn result in shorter chilling times, and therefore smaller chilling rooms, which leads to a considerable cost saving and time gain in the processing process.

In addition, hardly any water will drip off the poultry during its conveyance. This means that the poultry or the parts thereof can very advantageously be conveyed at different levels (viewed in the vertical direction) in the actual chilling room without water dripping onto birds below, with the result that optimum use can be made of the volume of the chilling room. Furthermore, this considerably reduces the risk of the birds contaminating one another.

In a very advantageous embodiment of the method, during the moistening of the poultry a water film is applied to the skin, substantially covering the entire skin of the poultry, and is maintained during the exposure to the chilling air. This means, inter alia, that the surface of the skin of the poultry does not become dry during the time it remains in the chilling room, and that no undesirable discoloration occurs. Furthermore, it is ensured that thick parts of the poultry, which have a greater heat content than thin parts of the poultry, cannot dry sooner than the thin parts. The removal of heat from thick parts of a carcass of a slaughtered bird will be a slower process than the removal of heat from a thinner part of the bird, on account of the slower transfer of heat through the thicker part. The thick parts of the poultry will consequently still have a higher temperature than the thin parts, so that, as a result of a greater difference in vapour tension between the moisture in a thick part and the moisture in the environment, more moisture will evaporate from a thick part than from a thin part. This effect can now be counteracted by keeping the surface of the skin moistened. An uneven distribution of moisture in the poultry can therefore be prevented in this way.

It is also ensured in this way that each part of the poultry to be chilled is subjected to the chilling in the same way, and the risk of, for example, frozen thin parts (at temperatures below freezing point) is prevented.

Maintaining the water film also has the advantageous effect that no moisture can be drawn from the poultry by direct evaporation from it. The moisture of the water film will evaporate instead of the moisture present in the meat.

According to another preferred embodiment of the method, poultry is conveyed hanging by both legs at least during its moistening. This ensures that for each slaughtered bird a specific and substantially identical positioning is achieved relative to the spray elements provided in the spray station.

According to a further feature of the method that can be used advantageously, in the case of poultry with an abdominal cavity the surface of the abdominal cavity of the poultry is also moistened by applying a water film to it. This achieves very focused and rapid cooling down of the poultry, and the poultry also reaches a predetermined temperature more quickly, while a more uniform temperature distribution is achieved in the poultry during its chilling. In addition, owing to the more uniform temperature distribution in the poultry during the chilling process, the chilling process can be regulated on the basis of a preset "average" temperature of the bird. Apart from that, the more uniform temperature distribution can prevent too rapid and/or too deep a cooling down of the outside of the slaughtered bird from occurring, which would have the risk of frozen wings and the like. The rapid and uniform cooling down of the poultry means that rapid control is gained over the growth of microorganisms in the meat.

According to a further feature of the method that can be used advantageously, the poultry or parts thereof is/are moistened periodically during the chilling. As a result of this, there can be a saving on the quantity of chilled water needed. Furthermore, owing to the periodic application of the water film to the skin, the water film can be kept as thin as possible, and as little water as possible is used.

A further feature of the method that can be used advantageously is based on the insight of periodic moistening being carried out with a time interval of approximately 3 to 15 minutes. This produces rapid renewal of the water film and consequently a rapid change in the conditions for the microorganisms in the water film. Such rapid changes in the conditions ensure that the microorganisms cannot adapt sufficiently quickly to the new and constantly changing conditions in the water film. A normal period in which a microorganism adapts to a new environment, the so-called lag phase, is approximately 20 minutes. A time interval of approximately 3 to 15 minutes in this respect is sufficiently short to prevent adaptation. It has also been found that in the case of small poultry such a time interval is suitable for maintaining the water film. This therefore has an advantageous inhibiting action on the growth of the microorganisms, and the meat acquires a longer shelf life. In addition, the temperature of the water film will increase slightly as it becomes thinner, with the result that the environment of microorganisms present in the water film will constantly change, and said organisms will have no—or at any rate less—chance of adapting to the changing environmental conditions and will multiply less, or at any rate less quickly.

According to a further feature of the method, the time interval increases during the conveyance of the poultry. Since the temperature of the poultry decreases as its chilling advances, the water film on the surface of the skin will evaporate increasingly less fast, and the time interval can be increased without the risk of disappearance, or local disappearance, of the water film here.

According to a further feature of the method, the water is electrostatically charged during its atomization, so that the water film can be applied to and maintained on the surface of the skin with even greater accuracy and with further reduced water consumption. The electrostatically charged water is attracted by the uncharged or oppositely charged carcass and therefore results in better moistening of the poultry.

According to a preferred embodiment of the method according to the invention, during the chilling the colour and/or colour change of the skin of the poultry or the parts thereof is assessed, and on the basis of that assessment the poultry is moistened or not. The assessment in this case can be performed by a person or, for example, by an image processing system.

During the chilling, the poultry absorbs some of the water film in the skin, so that the skin colour changes. By additional spraying, for example, additional water can be absorbed and the colour of the product thereby positively affected.

It may happen during the processing of the poultry in the slaughterhouse that before the abovementioned method is carried out the surface of the skin of the poultry has become completely or partially dry. In order to be able to carry out the abovementioned method successfully, it is advantageous for the surface of the skin to be fully moistened and for a water film that is applied to it not to disappear. In order to achieve this, in an advantageous variant of the method according to the invention, prior to the chilling of the poultry, said poultry is immersed in a bath of chilled water and/or sprayed liberally with chilled water. This restores the water film destroyed in a previous process.

The above and other aspects, features and advantages of the present invention will be explained in greater detail by the description that follows of the method according to the present invention on the basis of a preferred embodiment of a device for carrying out the method, with reference to the drawing, in which the same reference numerals indicate the same parts, and in which.

Figure 1:
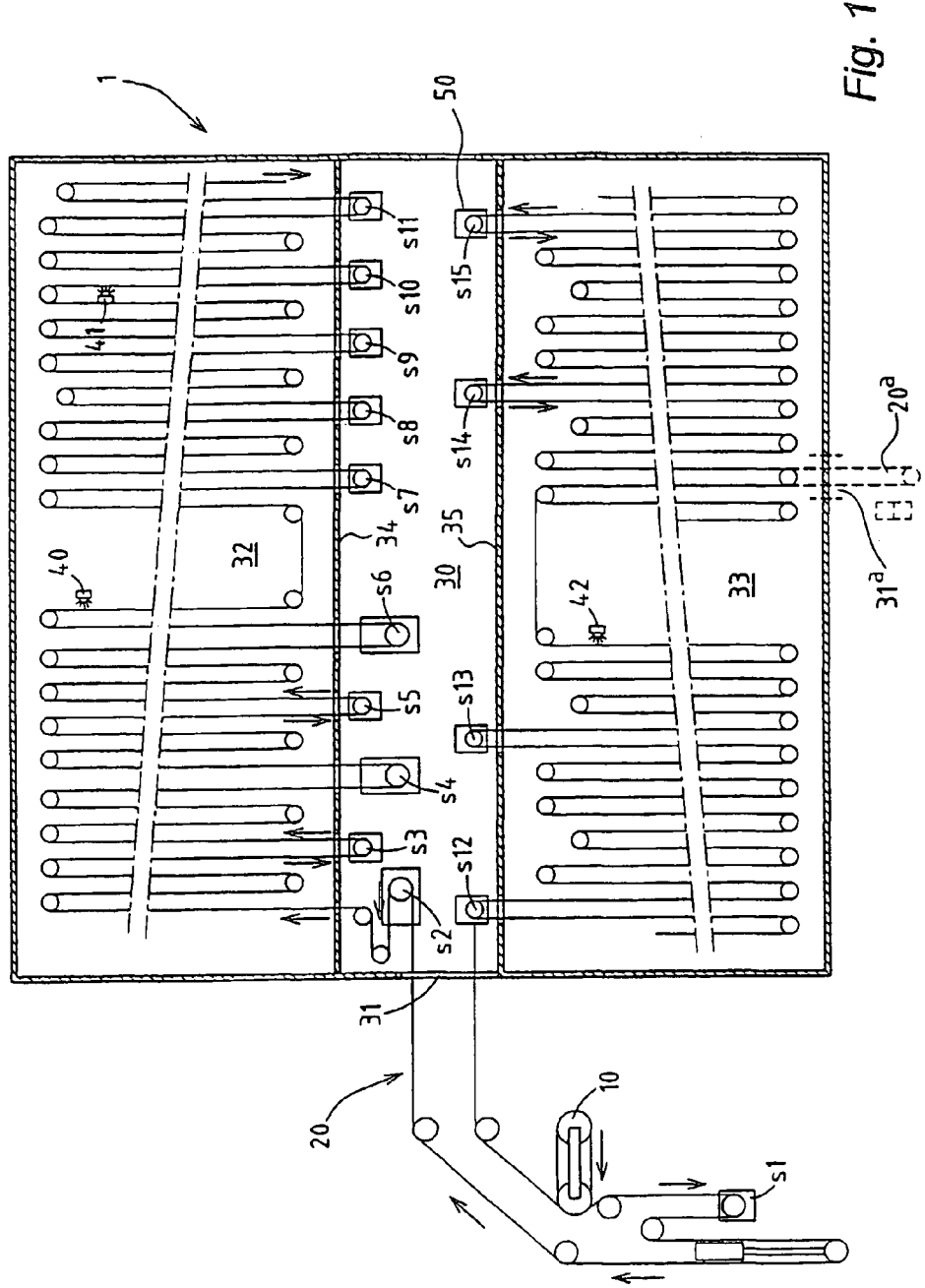
FIG. 1 shows a top view of a part of a device for carrying out the method according to the invention.

FIG. 1 shows a device for chilling slaughtered poultry, indicated in its entirety by the reference numeral 1. At a transfer station 10 the slaughtered poultry is transferred from a processing device (not shown in any further detail) upstream and hung in product carriers, which product carriers are interconnected and fitted in a movable manner in the conveyor 20. From the transfer station 10 the poultry is moved in a direction indicated by direction arrows along the course of the conveyor 20 to a first spray station S1. In the spray station S1 the poultry is sprayed with chilled water and conveyed further to an intermediate area 30 by way of an entrance 31. In the figure, in addition to the intermediate area 30, a first chilling room 32 and a second chilling room 33 are provided, in which chilling rooms the conveyor 20 follows its course in a serpentine manner. In this way the slaughtered poultry completes a zigzag path through the chilling rooms 32, 33, and the best possible use is made of the available space. The slaughtered poultry first passes through the first chilling room 32 and subsequently passes through the second chilling room 33.

Evaporators (not shown) of a chilling plant are situated in the chilling rooms 32, 33, which evaporators together with fans (not shown) blow a stream of chilled air over the slaughtered poultry.

Various spray stations S2–S15 (Sn) are situated in the intermediate area 30 at several places along the course of the conveyor 20. In the various spray stations the poultry is moistened by applying a water film to it by atomization of water with suitable spraying elements. The application of the water film to the poultry will be described in greater detail with reference to FIGS. 2–5. As can be seen clearly in the figure, the intermediate area 30 is screened off from the first chilling room 32 and the second chilling room 33 by two walls 34 and 35 respectively. Passage apertures are provided in the walls 34, 35, so that at a number of points along the conveyor 20 said apertures can extend into the intermediate area 30, so that the spray stations Sn can be reached. The walls 34, 35 ensure that the air stream in the chilling rooms 32, 33 will not, or at any rate will barely, be perceptible in the intermediate area 30. This achieves the great advantage compared with known devices that the application of the water film is carried out in a part of the chilling room 32, 33 separated from the stream of chilling air, so that no additional water in atomized form is introduced into the chilling room 32, 33 and would be spread through the chilling room 32, 33 by the air stream, so that it could precipitate on the evaporators.

In the event of chilling air at a temperature below freezing point being used, this can certainly have adverse effects, such as excessive frosting on the evaporators of the chilling plant(s). By avoiding extra moisture in the chilling rooms 32, 33, it is ensured that less defrosting capacity is needed (for defrosting the evaporators), which produces a cheaper and simpler device. Furthermore, compared with devices in which water is sprayed in the chilling rooms, it is now possible to work at a lower air temperature, so that there can be more rapid and deeper chilling.

In the event of chilling air at a temperature below freezing point being used, this will certainly be very advantageous if only for the reason that no additional defrosting capacity will be needed. Furthermore, compared with the known method, it is possible to work at a lower air temperature, so that there can be more rapid and deeper chilling. Another major advantage achieved with the method according to the invention is that less or no atomized water goes into the stream of chilling air, so that there is therefore no adverse effect on the degree of chilling as a result of the evaporation of atomized water in the stream of chilling air, and that it is possible to achieve lower chilling temperatures than is the case by conventional spray chilling methods. Lower chilling temperatures in turn result in short chilling times and therefore smaller chilling rooms, which produces a considerable cost saving and time gain in the processing process. Examples that can be given here are chilling air temperatures that lie below 3° C., and in particular even below 0° C., for example −2° C. This produces a considerably improved chilling process compared with the methods known in practice, for example Veerkamp, in which a combination of air chilling and moistening of the poultry leads to chilling air temperatures that cannot be lower than approximately 4° C. to approximately 6° C. In particular, by the Veerkamp method it is not possible to chill to the extent that the poultry or parts thereof is/are cooled down to the abovementioned air temperatures, which is actually possible by the method according to the invention, and is used in a preferred embodiment of the method.

It should be pointed out that the number of spray stations Sn is not restricted to the number shown in the figure, but can be adapted depending on the circumstances and requirements.

As an alternative, the spray stations Sn are provided along the course of the conveyor 20 in such a way that on leaving the chilling room 30 the poultry will actually have a dry skin surface. This produces an end product with the highest possible weight. It is also indicated in the figure that the spray stations Sn comprise a casing or wall 50 in which the actual application of the water film is carried out. Placing the spray elements in the casing 50 produces an even better screening-off of the chilling air, and it is even possible to dispense with the walls 34, 35 and place the spray stations Sn directly in the chilling rooms 32, 33.

In a preferred embodiment of the method according to the invention, the application of a water film to at least the skin of the slaughtered poultry is controlled on the basis of an evaluation of the colour and/or colour change of its skin. During the time that the poultry stays in the chilling rooms 32, 33, it can happen that the colour of the skin changes too much from the desired (uniform) colour. On the basis of the abovementioned evaluation, a decision can be taken to spray the poultry in one of the spray stations Sn and to moisten the surface of the skin. Sensors 40–42 are advantageously provided along the course of the conveyor 20, for the purpose of making the evaluation. The sensors 40–42 are connected to a control device (not shown in any further detail), which is designed to control spray stations Sn situated downstream.

It is also possible for the slaughtered poultry not to be made to pass through the entire chilling stage, but for the poultry to be removed from the chilling room 32, 33 at an earlier point at a part 20*a* of the conveyor 20, which is shown by broken lines in FIG. 1. In this way, it can be decided to remove moist poultry from the chilling stage, instead of poultry that is in fact dry at the end of chilling stage. An additional passage aperture 31*a* is provided for this purpose.

A bacteriostatic and/or a bactericidal agent may advantageously be added to the water used to spray the poultry, in order to inhibit the growth of bacteria. Such an agent can be, for example, a disinfectant. It is also possible to add, for example, lactic acid to the water to be used, in order to acidify the water, so that the water film is an acid environment for bacteria present in it. In this connection, it is advantageous to incorporate sensors along the course of the conveyor, which sensors measure the concentration of the disinfectant, and on the basis of that measurement it can be decided whether or not to apply such a disinfectant to the poultry.

In a variant of the device 1 for carrying out the method according to the invention that is not shown in any further detail, the time interval and/or distance between two successive spray stations Sn, Sm can be adapted to the specific features of and/or ultimate requirements of the poultry.

In a further preferred embodiment of the method according to the invention, other features of the poultry apart from the colour, such as the weight, quality and the like, are determined and recorded in evaluation stations designed for that purpose. In addition, in the case of each slaughtered bird the number of the product carrier in which the bird is situated, the belt number, the position number, the destination in the slaughterhouse and so forth are determined and stored in the control device. On the basis of this information, it is possible to control the processing process, and in the present case the chilling process of the poultry.

A further possibility for controlling the processing process of slaughtered poultry can be offered with such a control system if the temperature of the individual birds during the chilling stage is also measured and stored in the control device. So it is possible, for example, to remove certain birds prematurely from the line or to make them change route because these birds can, for example, be better processed at a different temperature. In this way, it is possible to make an even further breakdown into product properties.

Figure 2:
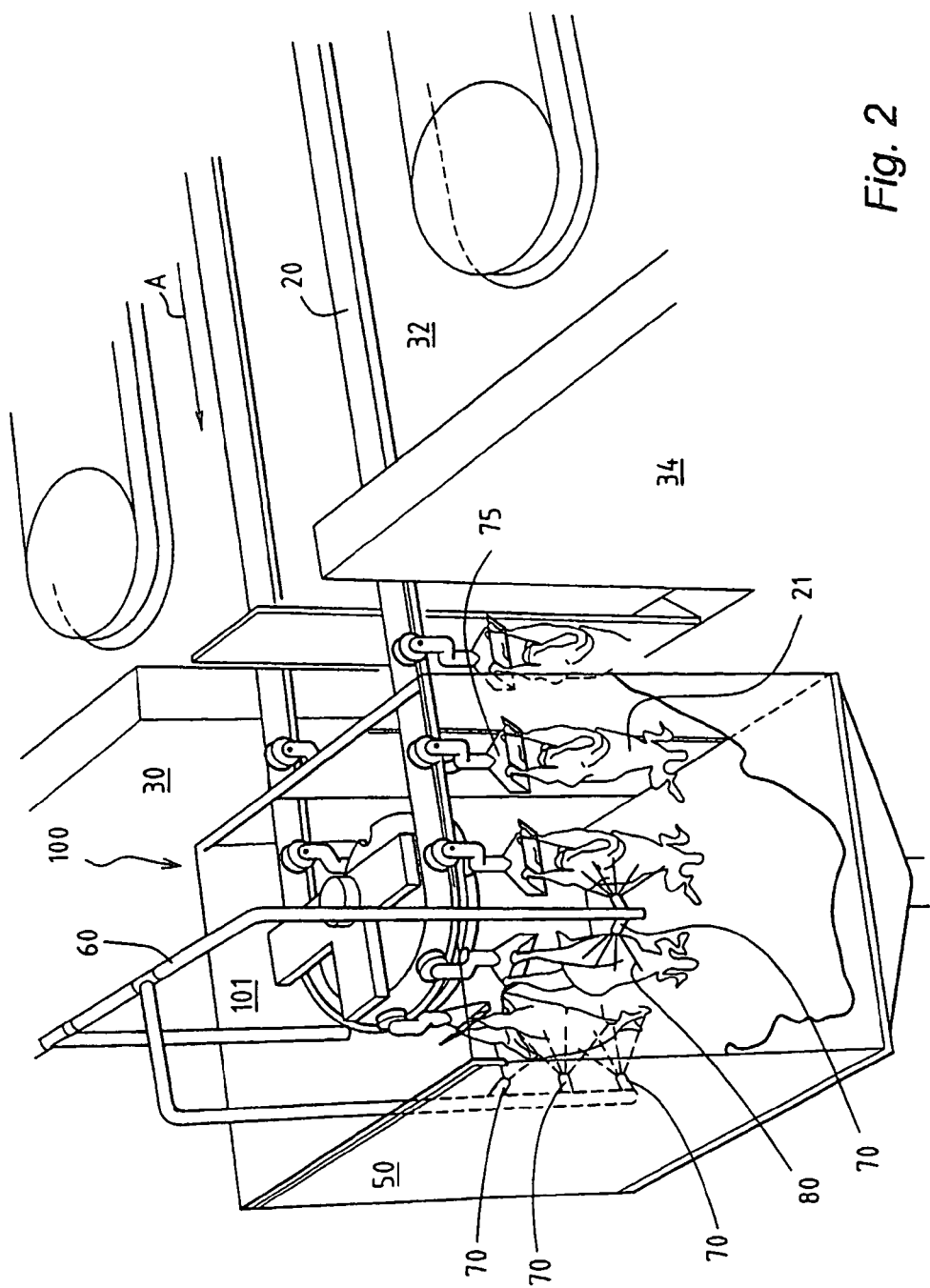
FIG. 2 shows an elevational view in perspective of a spray station for use in the device of FIG. 1.

A detailed illustration of one of the spray stations Sn from FIG. 1 is shown in FIG. 2. For the sake of clarity, the spray station is indicated by the reference numeral 100. The spray station 100 has a spray area 101, which is enclosed by a wall 50, which is open at the top in order to admit pipes for supplying water to nozzles 70. In the figure the wall 50 is partially cut away in order to make the figure clearer. The poultry 21 is moved, hanging by both legs in product carriers 75, along the conveyor 20 in a direction indicated by arrow A. As can be seen clearly in the figure, the conveyor 20 passes a wall 34 that forms a division between the chilling room 32 and the area 30 in which the spray station 100 is situated. The wall 34 ensures that the stream of chilling air circulated in the chilling room 32 cannot go near the spray area 101 of the spray station 100. The wall 50 of the spray station 100 here provides an even further improved screening-off of the spray area 101 relative to the chilling air.

By means of the nozzles 70, a quantity of chilled water 80 is atomized and sprayed onto the surface of the poultry 21. In order to moisten the entire external surface of the poultry 21, so that a water film is provided on it, it is advantageous to hang the individual birds by both legs in the product carriers 75 and to ensure during the conveyance along the conveyor 20 that the orientation of the poultry 21 relative to the conveyor 20 does not change. In this way the poultry 21 passes the various nozzles 70 in such a way that each part of the skin of the poultry 21 can be reached by the atomized water 80. The nozzles 70 preferably produce a conical jet and/or mist of water.

Figure 3:
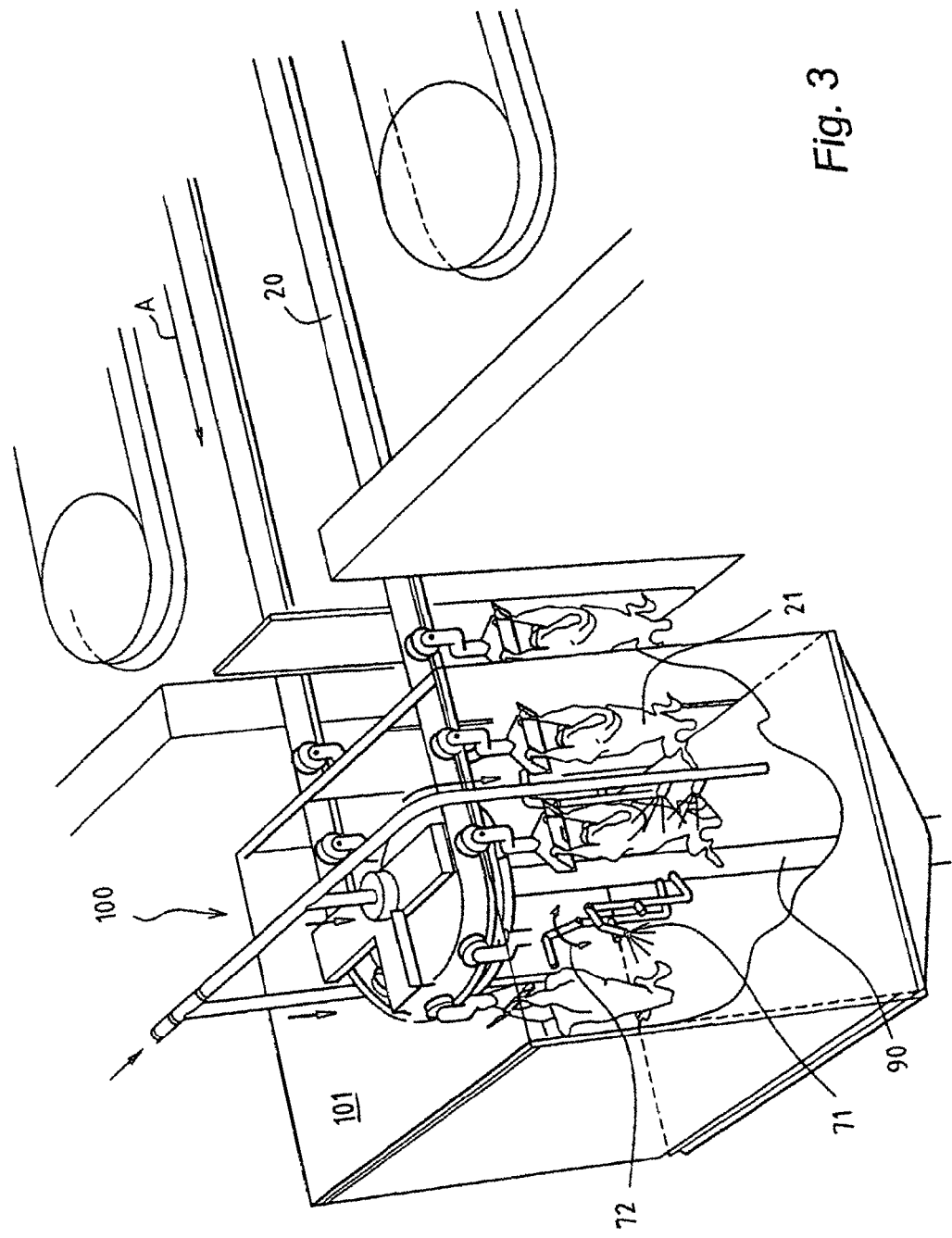
FIG. 3 shows an elevational view in perspective of the spray station of FIG. 2 with nozzles for moistening the abdominal cavity.

FIG. 3 shows a variant of the spray station 100, in which, apart from the skin of the poultry 21, its abdominal cavity is also moistened with the aid of tilting nozzles 71. The nozzles 71 are fitted on a rotatably driven central shaft 91, so that the nozzles 71 can move along with the poultry 21 during its movement along the conveyor 20. The tilting of the nozzles 71 from and to an inserted position of said nozzles is indicated by means of a double arrow 72.

Figure 4:
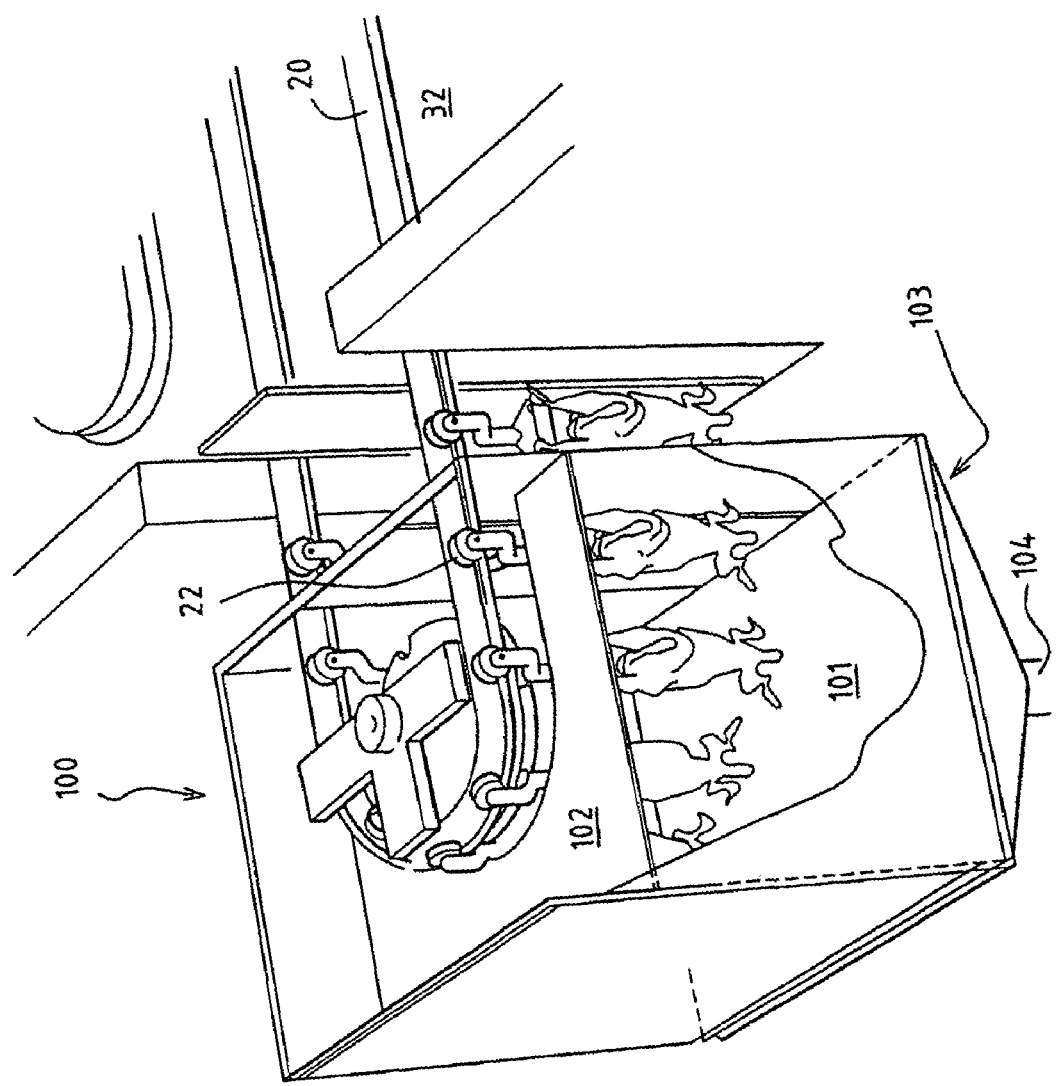
FIG. 4 shows an elevational view in perspective of a spray station according to FIG. 2 or 3 with a cover plate.

In order to obtain an even further improved screening-off of the spray area 101, it is possible, as shown in FIG. 4, to shut off the top of the spray area 101 by means of a cover plate 102. For the sake of simplicity of the illustration, the pipes 60 and nozzles 70, 71 are not shown. The cover plate 102 is preferably provided just below the conveyor 20, so that the water 80 from the nozzles 70, 71 is prevented as far as possible from going onto the pulleys 22 of the conveyor 20. In this way it can be ensured that moisture is prevented from being conveyed by means of the pulleys 22 to the chilling room 32 and, in addition, the running surface of the conveyor 20 along which the pulleys 22 roll is prevented from becoming soiled.

On its underside 103 the spray station 100 is provided with an outlet 104 for discharging any excess water.

The moistening of the poultry 21 can be carried out by means of nozzles 70, 71 known in practice, which nozzles apply a conical mist of water (droplets) to the surface of the skin of the poultry 21, but other ways of moistening the surface of the skin of the poultry 21 are also possible. It is important for the entire surface of the skin of the poultry 21 to remain moistened during its stay in the chilling room 32 by maintaining a water film on the skin.

In this way the invention provides an improved chilling process for chilling moistened poultry, by means of which process chilling can be carried out with a stream of chilled air at a considerably lower temperature than is possible in the case of known chilling processes for chilling moistened poultry. This is achieved by the invention by applying a water film to at least the entire external surface of a bird in a part of a chilling room where no—or at least hardly any—circulation of chilling air occurs. This means that a water film can still be applied in a very focused way and with a small quantity of water to the bird to be chilled, enclosing the entire bird, without atomized water being entrained in the strongly circulating stream of chilling air. The result is that the method according to the invention does not suffer the adverse effect of greater frosting on the evaporators of the chilling plants, and there are no undesirable evaporation phenomena of the atomized water that is entrained in the stream of chilling air. Furthermore, owing to the lower percentage of water in the chilling air, it is possible to work with air at a lower temperature.

In addition, it is ensured with the method according to the invention that the surface of the skin of slaughtered poultry remains moistened during the chilling process, or at any rate during the last phase of said process, while at the end of the chilling stage the surface of the skin is precisely dry. The fact that the skin is kept moistened has the advantage that no moisture loss, and thus no weight loss, will occur in the poultry. Furthermore, no brown discoloration of the skin will occur, and the skin is prevented from becoming water-repellent. Besides, the distribution of the moisture in the poultry is more uniform, and the skin also has a more even colour.

The scope of the present invention is not limited to the embodiments described above, but various changes and modifications of the invention are possible without departing from the scope of protection of the invention as defined in the appended claims.

What is claimed is:

1. A method of preserving slaughtered birds or parts thereof provided with skin, the method comprising:
  a. conveying product carriers through at least a portion of a chilling room, wherein each product carrier carries only one whole slaughtered bird or only one part thereof and wherein at least some of the slaughtered birds or parts thereof are conveyed through at least a portion of the chilling room in different horizontal planes when viewed in a vertical direction;
  b. chilling each slaughtered bird or part thereof by exposing the slaughtered bird or part thereof to a stream of chilling air in the chilling room; and
  c. moistening at least a portion of each slaughtered bird or part thereof by atomization of water, wherein the moistening of each slaughtered bird or part thereof occurs when the slaughtered bird or part thereof is not exposed to the stream of chilling air and comprises applying atomized water to the skin of the slaughtered bird or part thereof to form a water film thereon, the water film covering substantially the entirety of the skin of the slaughtered bird or part thereof and being maintained on the skin during chilling, wherein the water film substantially limits the amount of water that drips from the birds thereby considerably reducing the risk of the birds contaminating each other.

2. The method of claim 1, wherein the slaughtered birds or parts thereof are conveyed hanging by both legs during moistening.

3. The method of claim 1, wherein the slaughtered birds or parts thereof comprise an abdominal cavity and wherein moistening comprises applying the water film to at least a portion of the abdominal cavity of the slaughtered birds or parts thereof.

4. The method of claim 1, wherein the water comprises an antibacterial agent.

5. The method of claim 4, wherein the antibacterial agent comprises lactic acid.

6. The method of claim 1, wherein moistening at least a portion of each slaughtered bird or part thereof occurs periodically.

7. The method of claim 6, wherein moistening at least a portion of each slaughtered bird or part thereof occurs approximately every 3 to 15 minutes.

8. The method of claim 7, wherein moistening at least a portion of each slaughtered bird or part thereof occurs less frequently the further the slaughtered bird or part thereof is conveyed.

9. The method of claim 1, wherein the water is electrostatically charged during its atomization.

10. The method of claim 1, wherein approximately 10 to 25 grams of water are used to moisten each slaughtered bird or part thereof.

11. The method of claim 1, further comprising assessing the color of the skin of each slaughtered bird or part thereof doting processing and controlling moistening of the slaughtered bird or part thereof based on the assessment.

12. The method of claim 1, wherein the chilling air has a temperature of less than 3° Celsius.

13. The method of claim 1, wherein the chilling air has a temperature of less than 0° Celsius.

* * * * *